(12) United States Patent
Teruyama

(10) Patent No.: US 6,601,162 B1
(45) Date of Patent: Jul. 29, 2003

(54) PROCESSOR WHICH EXECUTES PIPELINE PROCESSING HAVING A PLURALITY OF STAGES AND WHICH HAS AN OPERAND BYPASS PREDICTING FUNCTION

(75) Inventor: Tatsuo Teruyama, Kawasaki (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/487,763

(22) Filed: Jan. 19, 2000

(51) Int. Cl.[7] .............................................. G06F 9/345
(52) U.S. Cl. ..................... 712/239; 712/218; 712/219
(58) Field of Search ................................ 712/233, 234, 712/235, 239, 218, 219

(56) References Cited

U.S. PATENT DOCUMENTS

| | | | |
|---|---|---|---|
| 5,560,032 A | * 9/1996 | Nguyen et al. ............... | 712/23 |
| 5,778,248 A | 7/1998 | Leung | |
| 5,805,852 A | 9/1998 | Nakanishi | |
| 5,872,986 A | 2/1999 | Heeb | |
| 6,131,157 A | * 10/2000 | Wang et al. ................ | 712/218 |
| 6,134,653 A | * 10/2000 | Roy et al. ................... | 712/228 |
| 6,272,619 B1 | * 8/2001 | Nguyen et al. ............... | 712/41 |
| 6,282,630 B1 | * 8/2001 | Nguyen et al. ............... | 712/23 |
| 6,441,842 B1 | * 8/2002 | Fandrianto et al. ...... | 348/14.13 |

OTHER PUBLICATIONS

Smith, James E. and Sohi, Gurndar S., The Micorarchitecture of Superscalar Processors, Dec. 1995, Proceedings of the IEEE, vol. 83, No. 12.*

* cited by examiner

Primary Examiner—Richard L. Ellis
Assistant Examiner—Tonia L. Meonske
(74) Attorney, Agent, or Firm—Gray Cary Ware & Freidenrich LLP

(57) ABSTRACT

A bypass logic circuit (30) generates select signals (SelRs0, SelRt0, SelRs1 and SelRt1) by using prediction result flags (PrdNTkn1A and PrdNTkn1D) which are results of prediction about branch, instead of a branch condition not-taken signal (NTknA) actually output from a branch unit (52). Bypass multiplexers (44, 46, 54, 56) select operands to be output to ALU (42) or the branch unit (52) on the basis of these select signals (SelRs0, SelRt0, SelRs1 and SelRt1). Therefore, ample time is given for generating these select signals (SelRs0, SelRt0, SelRs1 and SelRt1).

15 Claims, 14 Drawing Sheets

Loop :

Sub      r4 , r1 , r5

.
       .
       .

BNEL    r6 , r7 , Loop

Add      r1 , r2 , r3

AND     r4 , r1 , r5

FIG. 3

| I | R | A | D | W |

INSTRUCTION FETCHING
INSTRUCTION DECODING + REGISTER FILE READING OUT
ARITHMETIC
DATA CACHE ACCESS
WRITING BACK

FIG. 9

PRIOR ART

```
Loop :
        Add     r1 , r2 , r3
          .
          .
        BNE     r1 , r2 , Loop Sub     r3 , r4 , r5 lw      r6 , 0 (r7)
```

FIG. 10
PRIOR ART

```
Loop :
        Add     r1 , r2 , r3
          .
          .
        BNEL    r1 , r2 , Loop Sub     r3 , r4 , r5 lw      r6 , 0 (r7)
```

FIG. 11
PRIOR ART

PROCESSOR WHICH EXECUTES PIPELINE PROCESSING HAVING A PLURALITY OF STAGES AND WHICH HAS AN OPERAND BYPASS PREDICTING FUNCTION

BACKGROUND OF THE INVENTION

1. Field of the Invention

This invention relates to a processor, and, more particularly, to a processor which bypasses data upon pipeline processing.

2. Description of the Related Art

FIG. 8 is a diagram showing an internal structure of a conventional processor, and FIG. 9 is a diagram showing pipeline stages in each pipeline of the processor shown in FIG. 8.

As shown in FIG. 9, the processor of FIG. 8 has five pipeline stages, namely, "I stage" which is the stage for fetching an arithmetic instruction, "R stage" for decoding an instruction and reading a register out of a register file, "A stage" for an arithmetic operation, "D stage" for accessing a data cache and "W stage" for writing back arithmetic results to the register file. In this processor, the "A stage" is in charge of judging conditions of conditional branch instruction and determine whether branch is taken or not, in addition to arithmetic operation of instructions.

As shown in FIG. 8, the processor includes, mainly, an instruction fetch unit 110, register file 120, a bypass select logic circuit 130, two pipelines 140, 150, and registers RG101 through RG106.

Those two pipelines 140, 150 form an arithmetic unit. These two pipelines 140, 150 can simultaneously execute instructions. That is, this processor is a 2 way super scalar processor.

In the example of FIG. 8, the pipeline 140 includes an ALU 142, registers RG110 to 113, and bypass multiplexers 144, 146, and executes an ALU arithmetic instruction. The pipeline 150 includes a branch unit 152, registers RG120 to RG122, and bypass multiplexers 154, 156, and executes a branch instruction. Here is shown only ALU 142 and branch unit 152 for simplicity, each of these pipelines 140, 150 has other arithmetic devices as well.

In the "I stage", the instruction fetch unit reads out an arithmetic instruction from the instruction cache memory (not shown), then discerns the category of this arithmetic instruction, and sends out an executable instruction to the arithmetic unit. That is, the instruction fetch unit 110 fetches the arithmetic instruction and separates it into the part of instruction and the part of operands. Although not shown in FIG. 8, depending on the category of the instruction part of the arithmetic instruction, it sends the ALU instruction to the pipeline 140 having ALU 142 and conditional branch instruction to the pipeline 150 having the branch unit 152.

On the other hand, the instruction fetch unit 110 outputs source operand numbers Rs0R, Rt0R, Rs1R and Rt1R in the operand part of the arithmetic instruction to the register file 120. That is, the source operand numbers Rs0R and Rt0R are source operand number of instructions to be issued to the pipeline 140 whereas source operand numbers Rs1R and Rt1R are numbers of source operands of instructions to be issued to the pipeline 150.

Additionally, the instruction fetch unit 110 outputs destination operand number Rd0R in the operand part of the arithmetic instruction to a register RG101. This destination operand number Rd0R represents the number of the destination operand of the instruction to be issued to the pipeline 140. These source operand numbers Rs0R, Rt0R, Rs1R, Rt1R and destination operand number Rd0R are 5-bit signals. That is, here it is assumed that the processor has 32 registers.

Therefore, instruction mnemonics can be expressed as:
Add Rd, Rs, Rt

In any codes indicating various signals used in the present specification, let the end of each code indicate the stage where the signal has reached. For instance, a destination operand having the number Rd0R in the "R stage" gets the number Rd0A when reaching the "A stage".

The instruction fetch unit 110 outputs branch delay slot information BDS0R and instruction valid information Valid1R. The branch delay slot information BDS0R is a signal indicating whether an instruction in the pipeline 140 is that of the branch delay slot of a branch likely instruction or not. The branch delay slot is an instruction positioned just after the conditional branch instruction in a row of instructions. In the example of FIG. 8, if an instruction is just after the branch likely instruction, it becomes 1, and otherwise, it becomes 0. In this instruction set architecture (ISA), one instruction existing in the branch delay slot is executed in principle whether the condition of the immediately preceding conditional branch instruction has been established or not. That is, any instruction just after a normal conditional branch instruction is executed unconditionally. However, in the case of a branch likely instruction in this instruction set architecture, one instruction existing in the branch delay slot is not executed when the branch likely instruction is not taken. When it is taken, an instruction in the branch delay slot is executed.

One example of normal conditional branch instructions is shown in FIG. 10. In FIG. 10, Add instruction is an instruction of adding contents of the register r2 and contents of register r3 and storing its result in the register r1. BNE instruction is an instruction establishing branch when contents of the register Rs and contents of the register Rt are different. That is, when (contents of register r1)≠(contents of register r2), branch establishes with BNE instruction, and the process returns to Add instruction labeled Loop. However, Sub instruction existing in the branch delay slot is executed even when branch is established. That is, the instruction execution sequence is as follows:

Add → . . . →BNE→Sub→Add.

On the other hand, when the branch instruction is not taken, since the row of instructions is directly executed sequentially, the instruction execution sequence is as follows:

Add → . . . →BNE→Sub→Iw.

Here, Sub instruction is an instruction of subtracting contents of the register r5 from contents of the register r4 and storing its result in the register r3. Iw instruction is an instruction of loading data from memory whose address is 0+(contents of register r7) to the contents of the register r6.

The above is the row of execution of the normal conditional branch instruction. Next explained is a row of execution of branch likely instruction. FIG. 11 is a diagram showing a row of execution of branch likely instruction. As mentioned above, the branch likely instruction is an instruction for executing an instruction in the branch delay slot when branch is established, but not executing the instruction in the branch delay slot when branch is not established.

As shown in FIG. 11, BNEL instruction makes branching be established, and causes the process to return the Loop label and execute Add instruction when Rt≠Rs, namely, (contents of register r1)≠(contents of register r2).

Additionally, the Sub instruction in the branch delay slot is executed when branch is established. Therefore, instruction execution sequence is as follows:

Add → . . . →BNEL→Sub→Add

On the other hand, in case of the branch likely instruction, the branch delay slot is not executed when branch is not established. Therefore, the instruction execution sequence is as follows:

Add → . . . →BNEL→Iw

In this manner, branch likely instruction is different from the conditional branch instruction in how to progress the process when branch is not established, and the instruction in the branch delay slot is not executed.

Explanation is returned again to FIG. 8. Four source operand numbers Rs0R, Rt0R, Rs1R and Rt1R sent from the instruction fetch unit 110 in the "R stage" are input to the register file 120. In the register file 120, contents of registers corresponding to these source operand numbers Rs0R, Rt0R, Rs1R and Rt1R are read out. That is, data contents stored in individual registers are read out, and these data are taken as the source operand.

In this example, the source operand is 64-bit data, and these data, thus read out, are held in registers RG110, 111, 120 and 121, and sent to the next "A stage".

In the pipeline 140 in the "A stage", unless data bypass occurs, the source operand read from the register file 120 is transferred to ALU 142 and undergoes arithmetic operation. Data bypass occurs in the following case.

That is, if instructions in a data dependent relationship are closely positioned, before the result of preceding arithmetic operation is written back to the register file 120, the data dependent instruction is executed. Therefore, it is necessary to bypass the result of the preceding operation directly to the bypass multiplexers 144, 146, 154 and 156 not through the register file 120. FIG. 12 is a diagram showing a row of instructions including instructions in data dependent relationship in close locations.

In FIG. 12, the result of Add instruction is stored in the register r1, and the register r1 is used also as the source operand of Sub instruction. When two instructions are close to each other in this manner, the result of Add instruction has to be supplied from the "D stage" to the "A stage" of Sub instruction by using an internal bypass DA. This is called data bypass from "D stage" to "A stage". For similar reasons, it may occur that data should be bypassed from "W stage" to "A stage" by using the bypass WA.

When the arithmetic operation in ALU 142 is finished, its results are stored in the register RG112 in the D stage. In "D stage", although not shown here, the data cache memory is accessed. Therefore, the result of operation of ALU 142 is held in the register RG112 only during "D stage" to synchronize the timing for writing into the register file 120. Then, in the next cycle, it is stored in the register RG113 in the "W stage", and written back to the register file 120.

In the pipeline 150 having the branch unit 152, BNE instruction, BEQ instruction, BNEL instruction and BEQL instruction are processed.

BNE instruction is a normal conditional branch instruction, and branch is established when two source operands are not equal. BEQ instruction is also a normal conditional branch instruction, and branch is established when two source operands are equal. BNEL instruction is a branch likely instruction, and branch is established when two source operands are not equal. BEQL instruction is also a branch likely instruction, and branch is established when two source operands are equal.

FIG. 13 is a diagram showing an internal structure of the branch unit 152. As shown in FIG. 13, an operand P1RsA from the bypass multiplexer 154 and an operand P1RtA from the bypass multiplexer 156 are inputted into the branch unit in the "A stage". As mentioned before, the operands P1RsA and P1RtA are 64-bit data.

The operands P1RsA, P1RtA input to the branch unit 152 are introduced into a compare logic 160 for all bit comparison. Then, the compare logic 160 outputs 1 when these operands P1RsA and P1RtA are equal, and outputs 0 when they are not equal.

Output of the compare logic 160 is input to an AND circuit 161 in an inverted form and to an AND circuit 162 directly without being inverted. The AND circuit 161 is supplied with a decode BNE signal (DBNE) as well, and the AND circuit 162 is supplied with a decode BEQ signal (DBEQ) as well. The decode BNE signal (DBNE) is a signal which becomes 1 when the BNE instruction or the BNEL instruction reaches the "A stage", and the decode BEQ signal (DBEQ) is a signal which becomes 1 when the BEQ instruction or the BEQL instruction reaches the "A stage".

Outputs from these AND circuits 161, 162 are input to an OR circuit 163. Output from the OR circuit 163 is input to a NAND circuit 164 which is also supplied with instruction valid information Valid1A. This instruction valid information Valid1A is a signal indicating that a valid instruction has reached the "A stage" of the pipeline 150. As shown in FIG. 8, the instruction valid information Valid1A is output in the "R stage" together with an instruction by the instruction fetch unit 110 to the register RG103. This is the signal transferred to register 104 in the "A stage" along the pipeline stage.

Output of the NAND circuit 164 becomes a branch condition not-taken signal NTknA and becomes the output of the branch unit 152. As shown in FIG. 13, since the branch unit 152 is made, in the case where the operands P1RsA and P1RtA are equal and the instruction is the BEQ instruction or the BEQL instruction, branch is taken, and the branch condition not-taken signal NTknA becomes 0. In the case where the operands P1RsA and P1RtA are not equal and the instruction is the BNE instruction or the BNEL instruction, branch is taken, and the branch condition not-taken signal NTknA becomes 0. In all cases other than these two cases, the branch condition not-taken signal NTknA becomes 1.

The bypass select logic circuit 130 shown in FIG. 8 controls the bypass multiplexers 144, 146 in the pipeline 140, and the bypass multiplexers 154, 156 in the pipeline 150. This control is executed for transferring proper operands to ALU 142 and branch unit 152.

More specifically, the bypass select logic circuit 130 generates four select signals SelRs0, SelRt0, SelRs1 and SelRt1, and supplies them to the bypass multiplexers 144, 146, 154 and 156, respectively. The select signals SelRs0, SelRt0, SelRs1 and SelRt1 are one-hot 3-bit signals in which one bit in each 3-bit signal becomes 1.

In this example, when the bit 0 is 1, the bypass multiplexers 144, 146, 154 and 156 select and output operands from the bypass DA from the "D stage". When bit 1 is 1, the bypass multiplexers 144, 146, 154 and 156 select and output operands from the bypass WA from the "W stage". When bit 2 is 1, the bypass multiplexers 144, 146, 154 and 156 select and output operands from the register file 120.

Taking the select signal (SelRt0 as an example, an operation of the bypass select logic circuit 130 is explained. The select signal SelRt0 is required to be generated in a cycle preceding the cycle where data is expected to be bypassed, then latched by a flip-flop, and thereafter supplied to the bypass multiplexer 144. In general, since the "A stage" in the pipeline is the stage where operators such as ALU 142 operate, it is the stage where operation timing is the longest in most cases. Therefore, it is necessary to determnine the operands to be applied to ALU 142, etc. at the earliest possible timing For this purpose, operands of the bypass multiplexer 144 must also be made to pass at the earliest possible timing, and the select signal SelRt0 to be applied to the bypass multiplexer 144 must be decided earlier. Usually, therefore, the select signal SelRt0 should be generated in the "R stage" which is precedent to the "A stage".

FIG. 14 is a diagram showing an example of the internal structure of the bypass select logic circuit 130. As shown in FIG. 14, the bypass select logic circuit 130 includes four select signal generating circuits 132A through 132D. The select signal generating circuits 132A through 132D generate select signals SelRs0, SelRt0, SelRs1, and SelRt1, respectively.

The select signal generating circuits 132A through 132D are similar in structure. For example, the select signal generating circuit 132A includes compare logic 172, 174, AND circuits 176, 178, 180, 182, and inverter circuits 184, 186.

Operation of the select signal generating circuit 132A is explained, taking a case where a data bypass from the "D stage" to "A stage" occurs. A row of instructions causing the data bypass from the "D stage" to the "A stage" is the row of instructions shown in FIG. 12 explained above.

In the example shown in FIG. 12, the result of the arithmetic operation of the Add instruction has to be bypassed from the "D stage" to the "A stage" in the fourth cycle. For this purpose, in the preceding third cycle, the select signal SelRs0 therefore has to be generated.

In the third cycle, for the purpose of detecting data dependency between the Add instruction and the Sub instruction, the destination operand number Rd0A of the Add instruction having reached the "A stage" is compared with the source operand number Rs0R of the Sub instruction having reached the "R stage" by the compare logic 172. The compare logic 172 outputs 1 when the destination operand number Rd0A and the source operand number Rs0R coincide, and outputs 0 when they do not coincide. In this example, since the destination operand number Rd0A coincides with the source operand number Rs0R, the compare logic 172 outputs 1. Therefore, one of the inputs of the AND circuit 176 becomes 1.

The other input of the AND circuit 176 is supplied with a signal from a NAND circuit 190 which takes NAND of the branch delay slot information BDS0R and the branch condition non-taken signal NTknA. That is, instruction of the "A stage" is the next instruction of the branch likely instruction, and when this branch likely instruction is not taken, the output of the NAND circuit 190 becomes 0. In this example, since the Add instruction is not the branch display slot, the output of the NAND circuit 190 becomes 1. Therefore, the output of the AND circuit 176 is 1, and bit 0 of the select signal SelRs0 becomes 1. On the other hand, since the output of 1 at the AND circuit 176 is input to AND circuits 180, 182 through an inverter circuit 184, outputs of the AND circuits 180, 182 turn out 0, and bit 1 and bit 2 of the select signal SelRs0 become 0. The select signal SelRs0 is latched in a flip-flop 192A.

The select signal SelRs0 latched in the flip-flop 192A is input to the bypass multiplexer 144 in the next cycle. Based on the select signal SelRs0, the bypass multiplexer 144 selects an operand input from the bypass DA from the "D stage", and outputs it to ALU 142.

Next explained is a case where an instruction of the branch delay slot is cancelled and a data bypass from the "D stage" to "A stage" does not occur. FIG. 15 is a diagram showing a row of instructions causing the above-explained processing.

In the example shown in FIG. 15, register r1 of the Add instruction coincides with register r1 of the AND instruction. Additionally, the Add instruction comes next to the BNEL instruction which is a branch likely instruction. Further assume here that for this BNEL instruction, it is predicted the branch will not be taken. Therefore, the AND instruction coming next to the Add instruction in the row of instructions is executed speculatively. In this case, if the condition of the BNEL instruction is not established as predicted, the Add instruction positioned in the branch delay slot is cancelled, and therefore the data bypass from the Add instruction to the AND instruction is not effected. That is, in the fourth cycle, the bypass multiplexer 144 outputs the source operand input from the register file RG110 to ALU 142.

However, in the above-explained processor, since the bypass select logic circuit 130 has a long processing time, the operation frequency of the processor decreased. Its reason lies in that, for the judgment whether the branch of the conditional branch instruction is taken or not, it is necessary to compare the operand Rs and the operand Rt over all 64 bits in the branch unit 152 and it is not decided until the comparison progresses near to the end of the cycle.

This is explained in greater detail with reference to FIG. 16. FIG. 16 is a diagram explaining the operation timing of the branch condition non-taken signal NTknA and the select signal SelRs0 when the BNEL instruction and the AND instruction are positioned in consecutive cycles as shown in FIG. 15.

As shown in FIG. 16, in the first half of the "A stage" of the BNEL instruction, the bypass multiplexers 154 and 156 operate, and the operand to be input to the branch unit 152 is determined. After that, all bits of the 64-bit operand are compared in the branch unit 152. Therefore, it is nearly at the end of the "A stage" that the branch condition non-taken signal NTknA as the result of the comparison is determined. As explained above, since the bypass select logic circuit 130 needs the branch condition not-taken signal NTknA to generate the select signals SelRs0, SelRt0, SelRs1 and SelRt1, the generation of the select signals SelRt0, SelRs0, SelRs1 and SelRt1 is inevitably further delayed.

In general, it is optimum that the cycle time in a pipeline processing be set approximately in accordance with the time when the ALU arithmetic operation in the "A stage" comes to an end. That is, when it is set in this manner, highest operation frequency and best hardware efficiency are expected.

However, the time required for processing of ALU 142 and the time required for processing of the branch unit 152 are substantially equal. Additionally, the timing when ALU 142 is applied with an operand is substantially equal to the timing when the branch unit is applied with an operand. As a result, the rest of time for the bypass select logic circuit 130 using the branch condition not-taken signal NTknA which is the comparison result is small. Therefore, the bypass select logic circuit 130 becomes a bottleneck which decreases the operation frequency of the processor.

SUMMARY OF THE INVENTION

It is therefore an object of the invention to ensure that the bypass select logic circuit never become a bottleneck upon determination of the operation frequency of a processor. Thereby an object of the invention is to provide a processor with a high operation frequency.

According to the invention, there is provided a processor which executes pipeline processing having a plurality of stages, comprising:

an instruction fetch unit for fetching an arithmetic instruction to output a source operand number and a destination operand number of the arithmetic instruction, and when the arithmetic instruction is a conditional branch instruction, the instruction fetch unit predicting whether the condition of the conditional branch instruction will be established or not, and outputting its result as prediction result information;

a register file introducing the source operand number outputted from the instruction fetch unit to output a source operand corresponding to the source operand number;

a first pipeline having at least a bypass multiplexer and an arithmetic and logic unit, in which the bypass multiplexer is supplied with an arithmetic result operand which is a result of arithmetic operation of the arithmetic and logic unit and the source operand outputted from the register file, and the bypass multiplexer selecting one of the arithmetic result operand and the source operand in response to a select signal and outputting it to the arithmetic and logic unit;

a second pipeline including at least a branch unit for judging whether the condition of the branch instruction has been established or not; and a bypass select logic circuit for generating the select signal by using at least the prediction result information.

According to the invention, there is further provided a processor for executing pipeline processing including at least five stages from a first stage to a fifth stage, and having as an instruction set architecture at least a normal conditional branch instruction for executing an arithmetic instruction positioned in a row of instructions next to a conditional branch instruction irrespective of whether the condition of the conditional branch instruction is established or not, and a branch likely instruction for executing the arithmetic instruction positioned in the row of instructions next to the conditional branch instruction only when the condition of the conditional branch instruction is established, comprising:

an instruction fetch unit for fetching at least two arithmetic instructions and outputting one or two source operand numbers and one destination operand number for each of the arithmetic instructions, the instruction fetch unit predicting upon one of the arithmetic instructions being a branch likely instruction whether the condition of the branch likely instruction is established or not, and outputting its result as prediction result information in the first stage;

a register file for receiving the source operand numbers outputted from the instruction fetch unit and outputting source operands corresponding to the source operand numbers in the second stage;

a first bypass multiplexer supplied with a first arithmetic result operand which is an arithmetic result operand having reached the fourth stage, a second arithmetic result operand which is an arithmetic result operand having reached the fifth stage and one of the source operands of one of the arithmetic instructions, which is outputted from the register file, to select one of the first arithmetic result operand, the second arithmetic result operand and one of the source operands of one of the arithmetic instructions in response to a first select signal and output it as a first arithmetic operand in the third stage;

a second bypass multiplexer supplied with the first arithmetic result operand having reached the fourth stage, the second arithmetic result operand having reached the fifth stage and the other of the source operands of one of the arithmetic instructions, which is outputted from the register file, to select one of the first arithmetic result operand, the second arithmetic result operand and the other of the source operands of the one of the arithmetic instructions in response to a second select signal and output it as a second arithmetic operand in the third stage;

an arithmetic and logic unit supplied with the first arithmetic operand and the second arithmetic operand to execute an arithmetic operation on the basis of the first arithmetic operand and the second arithmetic operand in the third stage and output the arithmetic result as an arithmetic result operand;

a third bypass multiplexer supplied with the first arithmetic result operand having reached the fourth stage, the second arithmetic result operand having reached the fifth stage and one of the source operands of the other of the arithmetic instructions, which is outputted from the register file, to select one of the first arithmetic result operand, the second arithmetic result operand and the one of the source operands of the other of the arithmetic instructions in response to a third select signal and output it as a first comparison operand in the third stage;

a fourth bypass multiplexer supplied with the first arithmetic result operand having reached the fourth stage, the second arithmetic result operand having reached the fifth stage and the other of the source operands of the other of the arithmetic instructions, which is outputted from the register file, to select one of the first arithmetic result operand, the second arithmetic result operand and the other of the source operands of the other of the arithmetic instructions in response to a fourth select signal and output it as a second comparison operand in the third stage;

a branch unit supplied with the first comparison operand and the second comparison operand in the third stage to compare the first comparison operand and the second comparison operand and judge whether the condition of the branch instruction is established or not; and a bypass select logic circuit for generating the first to fourth select signals by using at least the prediction result information in the second stage.

BRIEF DESCRIPTION OF THE DRAWINGS

FIG. 3 is a diagram showing a row of instructions to be processed by the processor shown in FIG. 1;

FIG. 9 is a diagram explaining the contents of the five stages in pipeline processing;

FIG. 10 is a diagram showing a row of instructions including normal conditional branch instructions:to be processed by the processor shown in FIG. 8;

FIG. 11 is a diagram showing a row of instructions including branch likely instructions to be processed by the processor shown in FIG. 8;

DETAILED DESCRIPTION OF THE PREFERRED EMBODIMENTS

Figure 1:
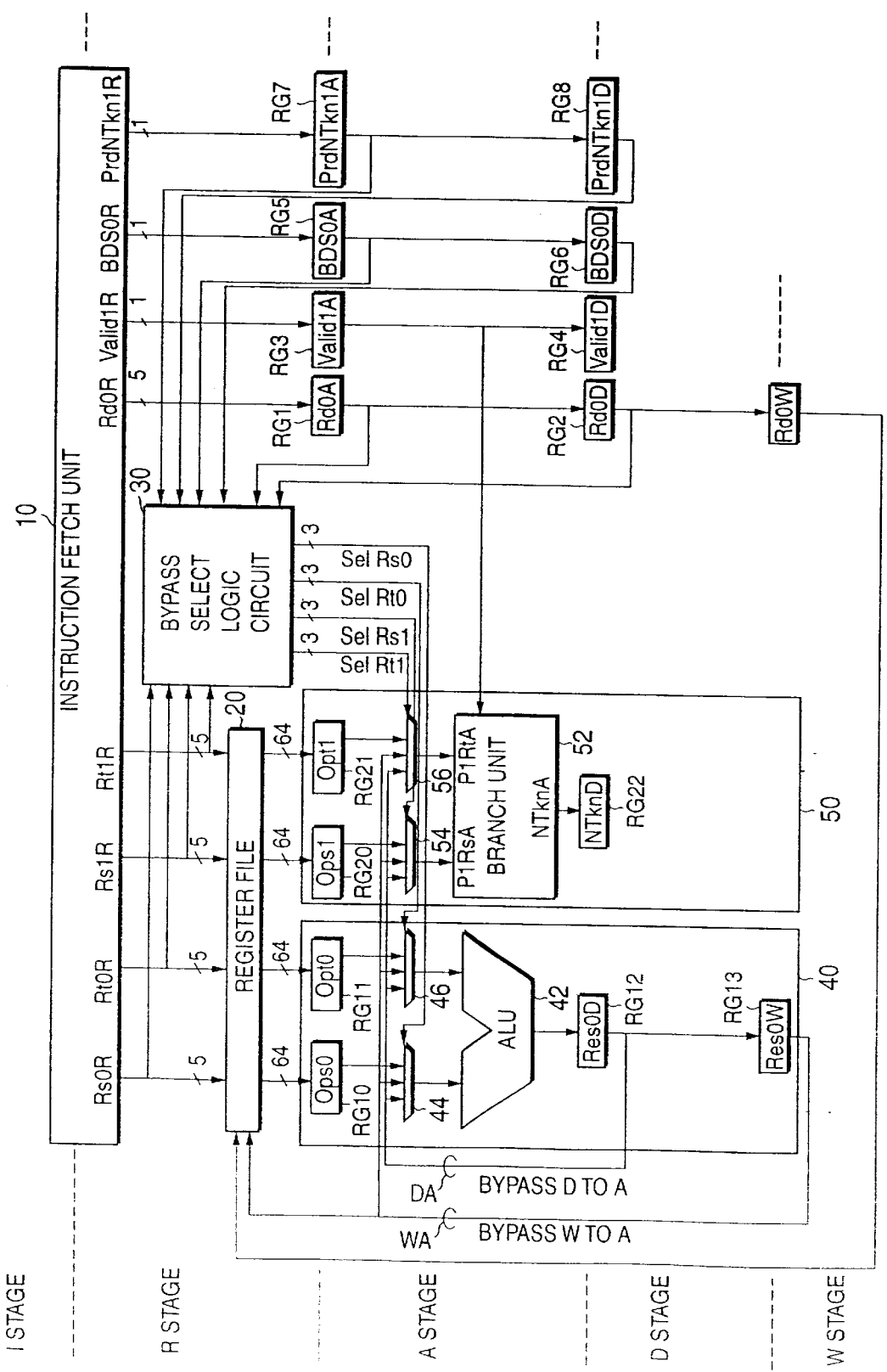
FIG. 1 is a diagram showing a major part of the internal structure of a processor according to an embodiment of the invention.

FIG. 1 is a diagram showing the internal structure of the processor according to an embodiment of the invention. As shown in FIG. 1, the processor shown here includes, as its major components, an instruction fetch unit 10, register file 20, bypass select logic circuit 30, first pipeline 40, second pipeline 50 and registers RG1 through RG8.

The first pipeline 40 includes registers RG10 through RG13, ALU 42, and bypass multiplexers 44, 46. The second pipeline 50 includes registers RG20 through RG22, branch unit 52, and bypass multiplexers 54, 56.

The processor shown here is characterized in the following three major points.

(a) In case that an instruction is a conditional branch instruction in the stage where the instruction fetch unit 10 fetches the instruction, it is predicted whether the condition of the conditional branch instruction holds or not. Then, the result of the prediction is output as a prediction result flag PrdNTkn1R. Furthermore, the instruction fetch unit 10 supplies the conditional branch instruction and subsequent instructions to pipelines 40, 50 on the basis of the result of prediction of branch.

(b) The prediction result flag PrdNTkn1R is transferred to the "A stage" and "D stage" in synchronism with the instruction portion and source operand portion of the conditional branch instruction, and stored in the registers RG7, RG8, respectively. These are prediction result flags PrdNTkn1A and PrdNTkn1D, respectively.

(c) The bypass select logic circuit 30 generates select signals SelRs0, SelRt0, SelRs1 and SelRt1, using prediction result flags PrdNTkn1A and PrdNTkn1D obtained as a result of a prediction of a branch instead of an actual branch condition not-taken signal NTknA output from the branch unit 52.

More specifically, if the instruction fetch unit 10 fetches a conditional branch instruction in the "R stage", it issues the instruction portion and the source operand portion of this conditional branch instruction to the second pipeline 50 having the branch unit 51. At that time, the instruction fetch unit 10 predicts whether the branch condition of the issued conditional branch instruction will be established or not. Although any way of prediction is acceptable, it is employable, for example, to hold the past history of establishment/non-establishment of the condition in the conditional branch instruction and use the more frequent result as the prediction result.

Figure 2:
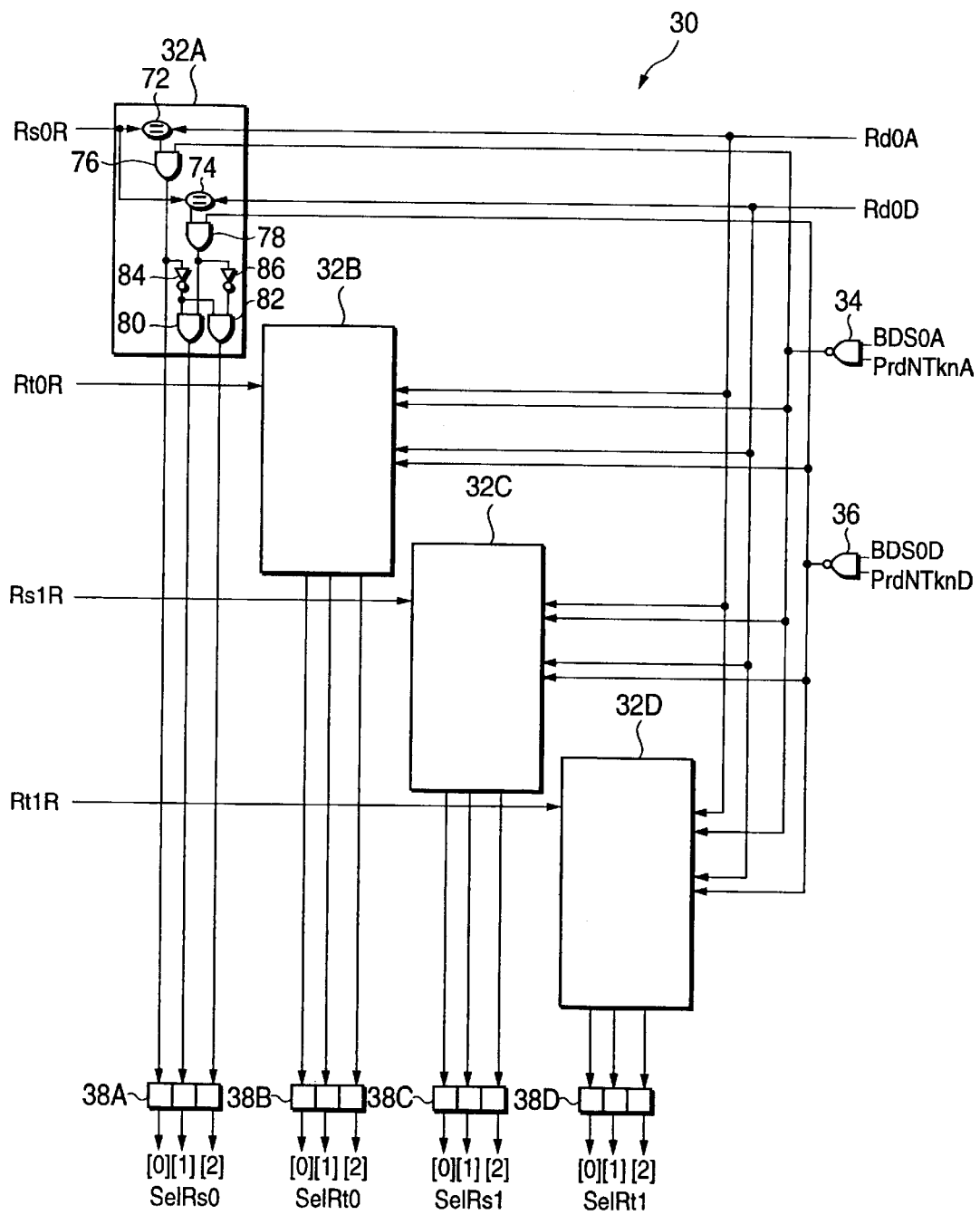
FIG. 2 is a diagram showing an internal structure of a bypass select logic circuit shown in FIG. 1.

FIG. 2 is a diagram showing the internal structure of the bypass select logic circuit 30 in FIG. 1. As shown in FIG. 2, the bypass select logic circuit 30 includes select signal generating circuits 32A through 32D, NAND circuits 34, 36 and flip-flops 38A through 36D.

Input to the NAND circuit 34 are branch delay slot information BDS0A stored in the register RG5 and the prediction result flag PrdNTkn1A stored in the register RG7. That is, the branch delay slot information BDS0A and the prediction result flag PrdNTkn1A having reached the "A stage" are input. The output of the NAND circuit 34 is input to each of the select signal generating circuits 32A through 32D.

Input to the NAND circuit 36 are branch delay slot information BDS0D stored in the register RG6 and the prediction result flag PrdNTkn1D stored in the register RG8. That is, the branch delay slot information BDS0D and the prediction result flag PrdTNkn1D having reached the "D stage" are input. The output of the NAND circuit 36 is also input to each of the select signal generating circuits 32A through 32D.

It is one of the features of this embodiment that, in this manner, the bypass select logic circuit 30 uses the prediction result flags PrdNTkn1A and PrdNTkn1D for generating the select signals SelRs0, (SelRt0, SelRs1 and SelRt1 used to switch the bypass multiplexers 44, 46, 54, 56.

The select signal generating circuits 32A through 32D have substantially identical internal structures. Taking the select signal generating circuit 32A as an example, it includes compare logic 72, 74, AND circuits 76, 78, 80, 82 and inverter circuits 84, 86.

Next explained are data bypassing operations of the processor shown in FIGS. 1 and 2, dividing them into different cases: (1) when it is predicted that branch of the branch likely instruction will be taken; (2) when it is predicted that branch of the branch likely instruction will not be taken; (3) when bypassing from the "D stage" to the "A stage" occurs with a normal instruction other than a conditional branch instruction; (4) when bypassing from the "W stage" to the "A stage" occurs with a normal instruction other than a branch instruction; and (5) when bypassing does not occur and a source operand from the register file 20 is selected.

(1) When predicting that branch of the branch likely instruction will be taken:

When the instruction fetch unit 10 fetches a conditional branch instruction of the branch likely instruction and predicts that branch will be taken, it issues this conditional branch instruction to the second pipeline 50 and outputs the prediction result flag PrdNTkn1R equal to 0. That is, in this embodiment, it raises 0 as the prediction result flag PrdTkn1R when predicting that branch will be taken, and raises 1 when predicting that branch will not be taken. Although this embodiment is configured to raise 1 as the prediction result flag PrdNTkn1R just when predicting with the branch likely instruction that branch will not be taken, it may be designed to raise 1 as the prediction result flag PrdNTkn1R also when predicting with a normal conditional branch instruction that branch will be not taken.

For example, let the row of instructions shown in FIG. 3 be processed by this processor. Then, under the prediction that the branch of the row of instructions shown in FIG. 3 will be taken, the processor processes the branch likely instruction, i.e., the BNEL instruction, and subsequent instructions by the pipeline processing as shown in FIG. 4.

Figure 4:
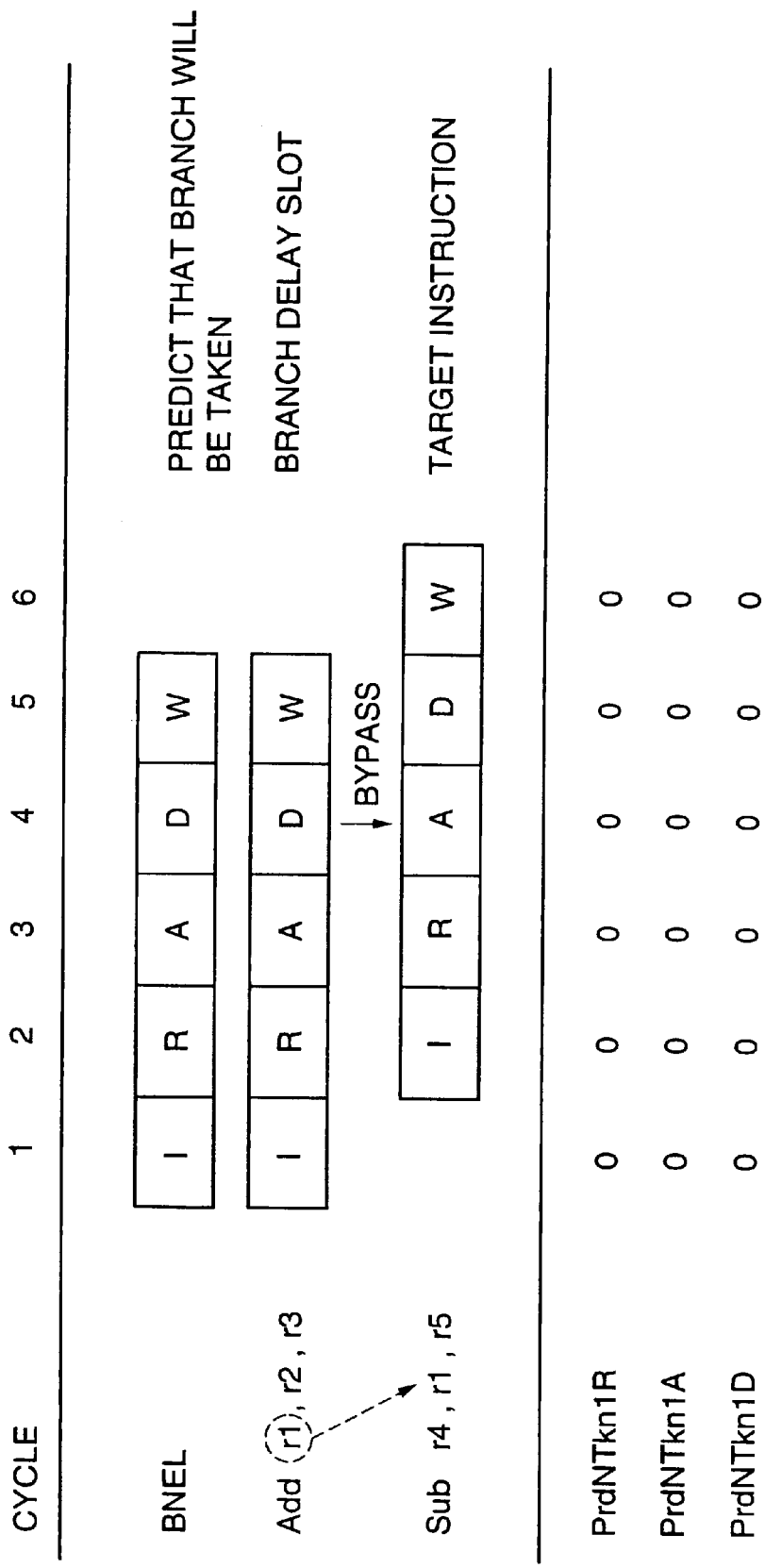
FIG. 4 is a timing chart of a case where, under a prediction that the branch of the row of instructions shown in FIG. 3 will be taken, a BNEL instruction, which is a branch likely instruction, and subsequent instructions are processed by the processor.

As shown in FIG. 4, the instruction fetch unit 10 fetches the BNEL instruction and the Add instruction in the first cycle, issues the BNEL instruction to the pipeline 50 and the Add instruction to the first pipeline 40 in the second cycle. Since here is predicted that the branch condition of the BNEL instruction is established, it raises 0 as the prediction result flag PrdNTkn1R, and outputs it to the register RG7.

In addition, since it is predicted that the branch will be taken, the target instruction, which is the instruction of the branch destination, is given to the pipeline. That is, in the second cycle, the instruction fetch unit 10 issues the target instruction, i.e., Sub instruction, to the first pipeline 40.

In the third cycle, the BNEL instruction and the Add instruction have already reached the "A stage", and the target instruction, i.e. Sub instruction, has already reached the "R stage". Since bypassing: from the Add instruction to the Sub instruction occurs in the fourth cycle, it is necessary to determine in the third cycle whether the data bypass should occur or not. That is, in the third cycle, the bypass select logic circuit 30 has to determine the select signals SelRs0, SelRt0, SelRs1 and SeRt1.

Referring to FIG. 2, a process of generating the select signal SelRs0 is shown in greater detail. In this example, the source operand number Rs0R and the destination operand number Rd0A are compared in compare logic 72 of the select signal generating circuit 32A. In this example, since the source operand number Rs0R in the "R stage" and the destination operand number Rd0A in the "A stage" are equal in the register r1, the output of the compare logic 72 is 1. That is, it is detected that a dependency about the register r1 exists between the Add instruction and the Sub instruction. In addition, since the prediction result flag PrdNTkn1a is 0 as explained above, the output of the NAND circuit 34 is also 1. In this manner, since the output of the compare logic is 1 and the output of the NAND circuit 34 is also 1, the output of the AND circuit 76 becomes 1. Therefore, 1 is stored in bit 0 of the flip-flop 38A.

On the other hand, since the output of the AND circuit 76 is 1, one of the inputs of the AND circuit 80 and one of the inputs of the AND circuit 82 are 0, and the outputs of the AND circuits 80, 82 are 0. Therefore, 0 is stored in bit 1 and bit 2 of the flip-flop. 38A. As a result, select signal SelRs0 is generated, and it is supplied from the flip-flop 38A to the bypass multiplexer 44 in the next fourth cycle. The bypass multiplexer 44 receiving the select signal SelRs0 having 1 in bit 0 selects an operand input from the bypass DA, and outputs it to ALU 42. As a result, data bypass from the "D stage" to the "A stage" takes place in the fourth cycle.

That is, the instruction fetch unit 10 has predicted that the branch of the BNEL instruction will be taken. If this prediction is proper, then it is predicted that the Add instruction in the branch delay slot will not be cancelled. Therefore, it results in the select signal SelRs0 being generated by the bypass select logic circuit 30 so as to ensure data bypass from the Add instruction to the next instruction, i.e., Sub instruction.

When this branch prediction is true, the processor continues its processing If the prediction is false, it means that the branch was not taken. Therefore, the next instruction of the branch likely instruction is not executed. That is, the Add instruction in the branch delay slot becomes an instruction not executed. Therefore, this Add instruction is cancelled. Additionally, since a branch was not taken, the next target instruction, namely, the Sub instruction, is also cancelled. Therefore, even if the data bypass is erroneous, it is immaterial.

(2) When predicting that the branch of the branch likely instruction will not be taken:

When the instruction fetch unit fetches the conditional branch instruction of the branch likely instruction and predicts that the branch will not be taken, it issues this conditional branch instruction to the second pipeline 50 and also outputs 1 as the prediction result flag PrdNTkn1R.

Assume, for example, that the row of instructions as shown in FIG. 3 explained above is processed by this processor. Then, under the prediction that the branch of the row of instructions shown in FIG. 3 will not be taken, the processor processes the branch likely instruction, i.e., the BNEL instruction, and subsequent instruction, by pipeline processing as shown in FIG. 5 as follows.

Figure 5:
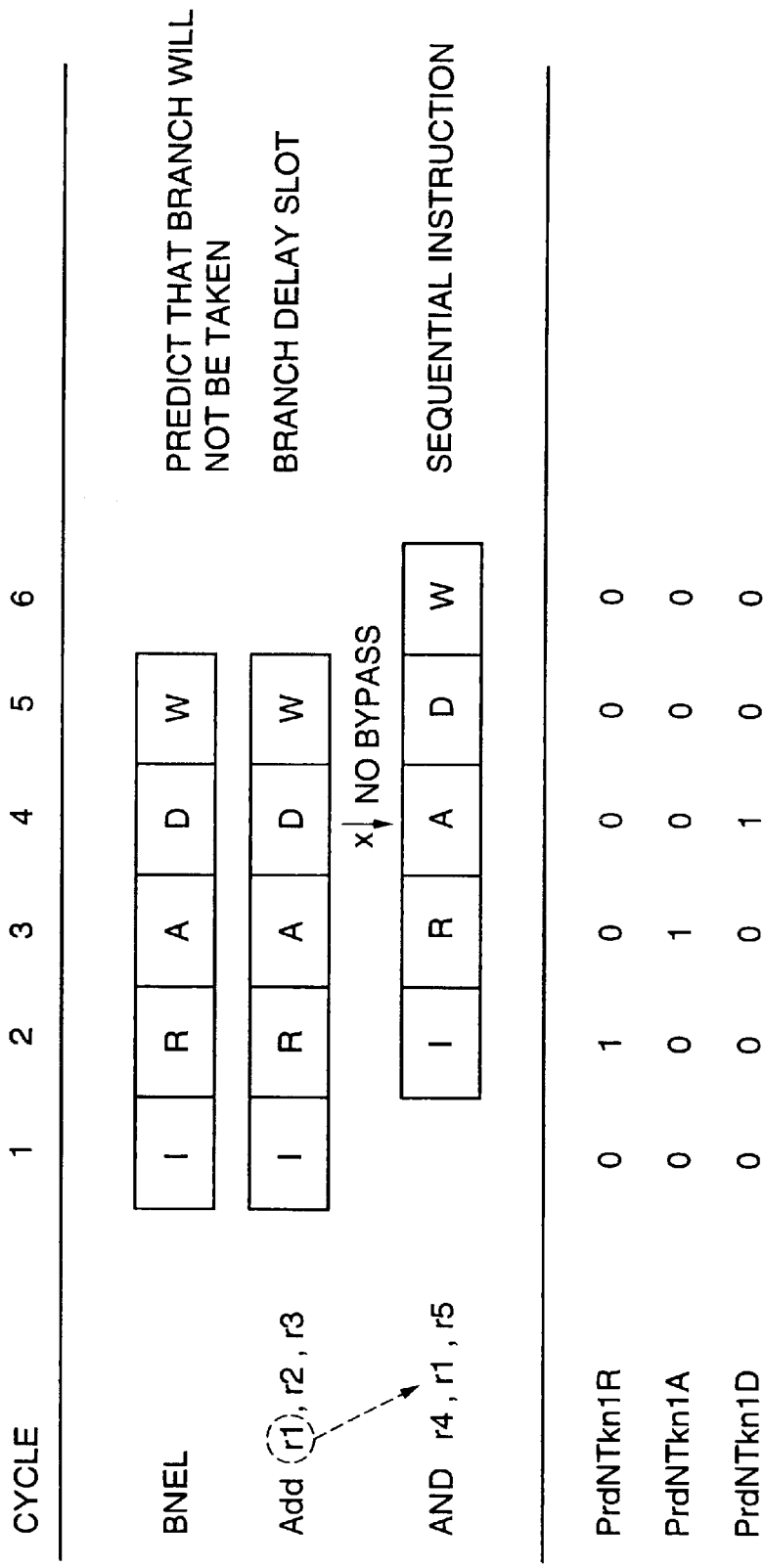
FIG. 5 is a timing chart of a case where, under a prediction that the branch of the row of instructions shown in FIG. 3 will not be taken, the BNEL instruction, which is a branch likely instruction, and subsequent instructions are processed by the processor.

As shown in FIG. 5, the instruction fetch unit 10 fetches the BNEL instruction and Add instruction in the first cycle, and issues the BNEL instruction to the second pipeline 50 and Add instruction to the first pipeline 40 in the second cycle. Additionally, since it has predicted that the branch condition of the BNEL instruction will not be taken, it outputs 1 as the prediction result flag PrdNTkn1R to the register R7 in the second cycle.

Further, since it has predicted that the branch will not be taken, it throws the next instruction, i.e. sequential instruction, to the pipeline. That is, in the second cycle, the instruction fetch unit 10 issues the AND instruction after the Add instruction to the first pipeline 40.

In the third cycle, the BNEL instruction and the ADD instruction have already reached the "A stage", and the sequential instruction, namely, the AND instruction, has already reached the "R stage". Since bypass from the Add instruction to the AND instruction occurs in the fourth cycle, it must be determined in the third cycle whether the data bypass should occur or not. That is, the bypass select logic circuit 30 must determine select signals SelRs0, SelRt0, SelRs1 and SelRt1 within the third cycle.

With reference to FIG. 2, explanation is made in greater detail on how the select signal SelRs0 is generated. In this example, the compare logic 72 of the select signal generating circuit 32A judges whether the source operand number Rs0R and the destination operand number Rd0A are equal or not. In this example, since the source operand number Rs0R in the "R stage" and the destination operand number Rd0A in the "A stage" are equal in the register r1, the output of the compare logic 72 is 1. That is, it is detected that a dependency about the register r1 exists between the Add instruction and the AND instruction.

In addition, since the Add instruction is next to the branch likely instruction, the branch delay slot information BDS0A is 1. Therefore, the prediction result flag PrdNTkn1A is 1, and the branch delay slot information BDS0A is also 1, so that output of the NAND circuit 34 becomes 0. In this manner, since the output of the compare logic is 1 and the output of the NAND circuit 34 is 0., the output of the AND circuit 76 becomes 0. Therefore, 0 is stored in bit 0 of the flip-flop 38A. On the other hand, since the output of the AND circuit 76 is 0 one of the inputs of the AND circuit 80 and one of the inputs of the AND circuit 82 become 1.

Further, the compare logic 74 compares whether the source operand number Rs0R and the destination operand number Rd0D are equal or not. Assume here that there is not a dependency between the operands of the instruction in the "R stage" and the operands of the instruction in the "D stage". Therefore, the source operand number Rs0R in the "R stage" is not equal to the destination operand number Rd0D in the "D stage". Then, the output of this compare logic 72 is 0. Further, assume here that the instruction in the "D stage" is not positioned in the branch delay slot of the branch likely instruction. Therefore, in the NAND circuit 36, the branch delay slot information BDS0D is 0 and the prediction result flag PrdNTkn1D is also 0. Then, the output of the NAND circuit 36 is 1. As a result, the output of the AND circuit 78 is 0. Therefore, the other inputs of the AND circuit 80 are supplied with 0, and the other inputs of the AND circuit 82 are supplied with 1.

Therefore, the output of the AND circuit 80 becomes 0, and 0is stored in bit 1 of the flip-flop 38A. Additionally, the output of the AND circuit 82 becomes 1, and 1 is stored in bit 2 of the flip-flop 38A. As a result, the select signal SelRs0 is generated, and in the next fourth cycle, it is supplied from the flip-flop 38A to the bypass multiplexer 44. The bypass multiplexer 44 receiving the select signal SelRs0 having 1 in bit 2 selects an operand input from the register file 20, and outputs it to ALU 42. That is, data bypass does not occur.

That is, the instruction fetch unit 10 has predicted that the branch of the BNEL instruction will not be taken. If this prediction turns out true, it is predicted that the Add instruction in the branch delay slot will be cancelled. In this case, since data must not be bypassed from the Add instruction to the next instruction, i.e., the AND instruction, the bypass select logic circuit 30 generates the select signal SelRs0 to ensure that data bypass never occurs.

If the branch prediction turns out true, the processor continues this processing through. That is, after canceling the Add instruction, it reads the contents of the register r1 from the register file 20, and executes the AND instruction.

When the prediction is false, it means that the branch has been taken. Therefore, the instruction next to the branch likely instruction is executed as it is. That is, the Add instruction in the branch delay slot is executed directly. However, since the branch has been taken, the next sequential instruction, i.e., AND instruction, is cancelled and not executed. Therefore, even if the bypass prediction is wrong, it is immaterial.

Although explanation has been made on a case when data bypass from the "D stage" to the "A stage" occurs, the procedure is still applicable also when data bypass from the "W stage" to the "A stage" occurs.

Figure 12:
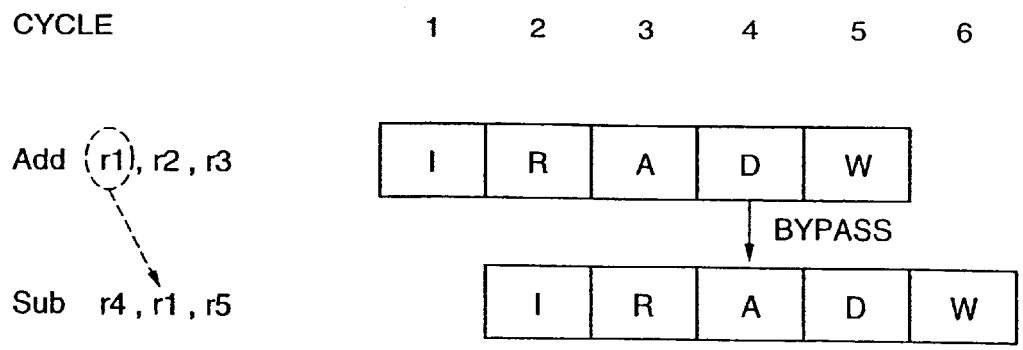
FIG. 12 is a diagram showing rows of instructions in which instructions having dependency between their source operands are closely located.
Figure 13:
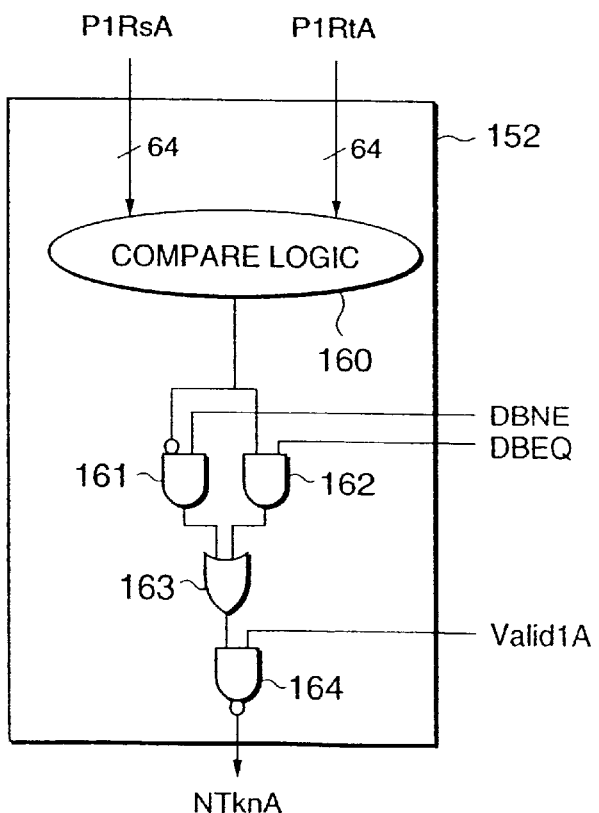
FIG. 13 is a diagram showing an internal structure of a branch unit shown in FIG. 8.
Figure 14:
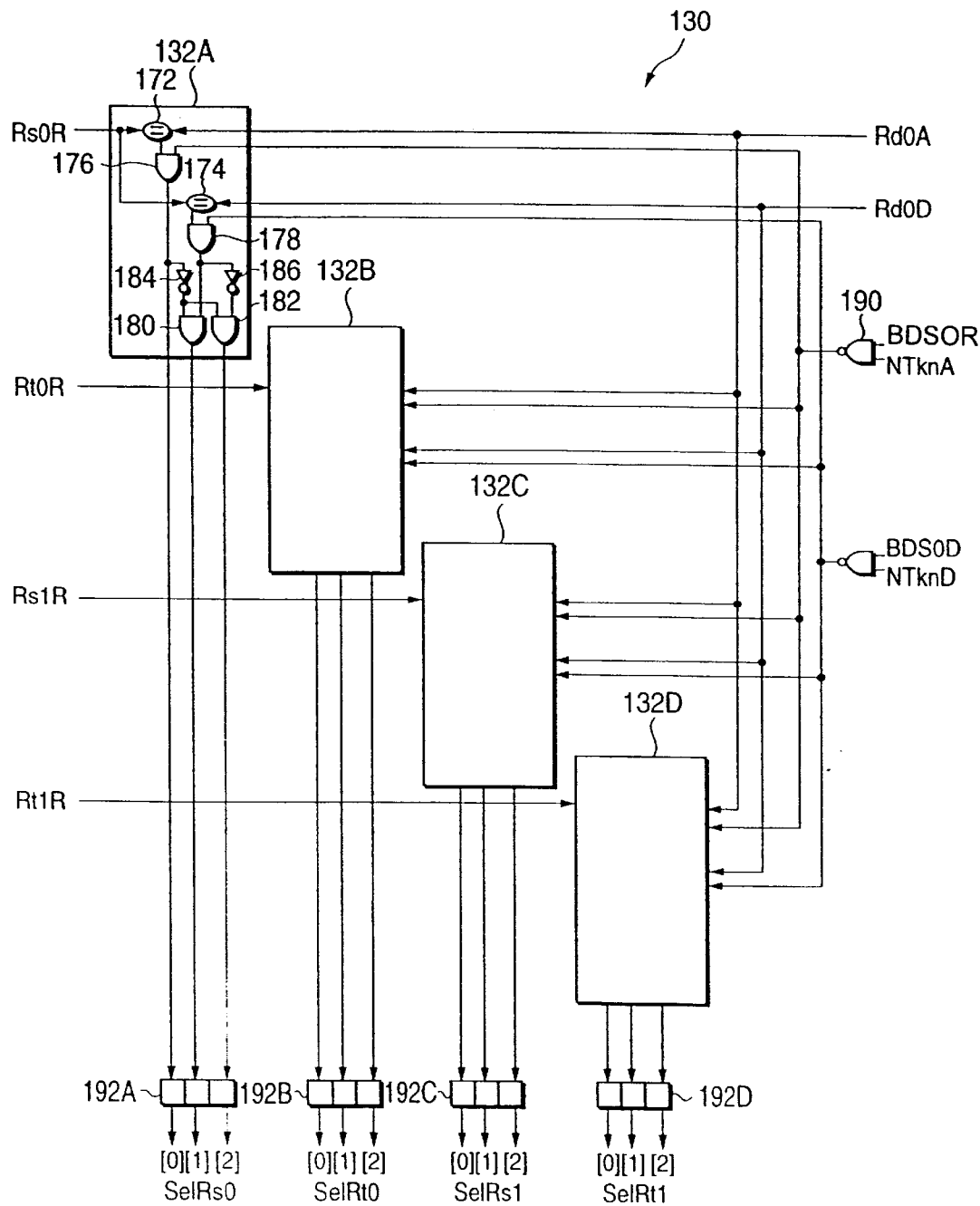
FIG. 14 is a diagram showing an internal structure of a bypass select logic circuit shown in FIG. 8.
Figure 15:
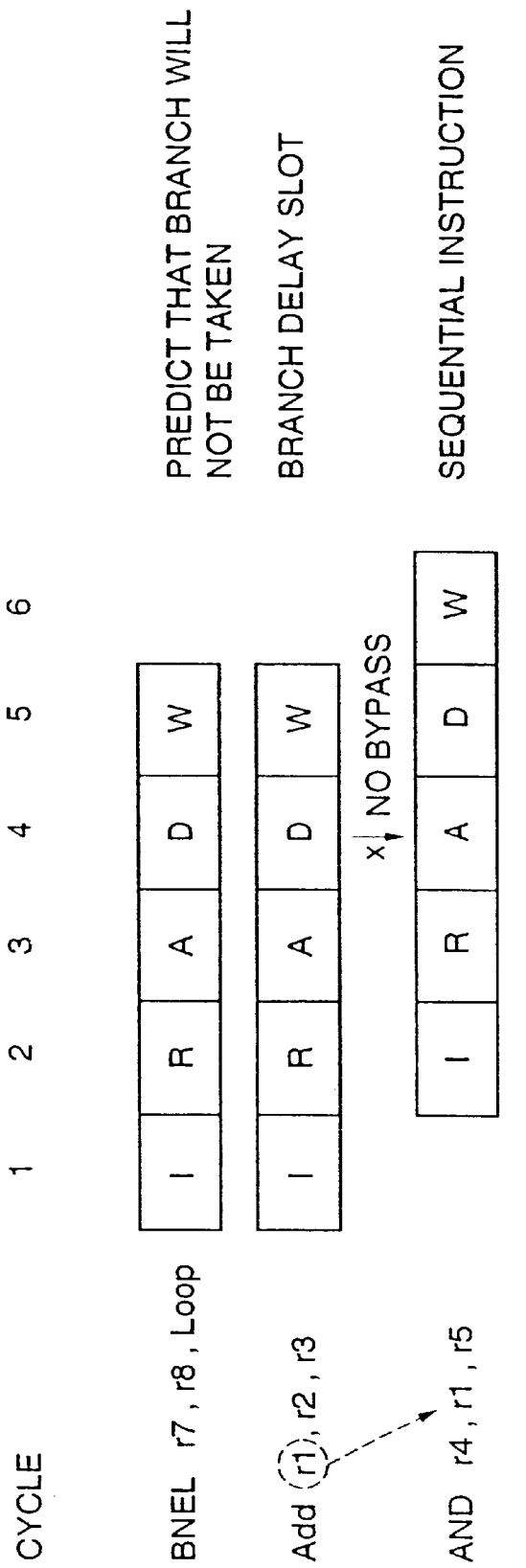
FIG. 15 is a timing chart of a case where, under the prediction that the condition of the row of the branch likely instruction will not be taken, the BNEL instruction, which is a branch likely instruction, and subsequent instructions are processed by the processor.
Figure 16:
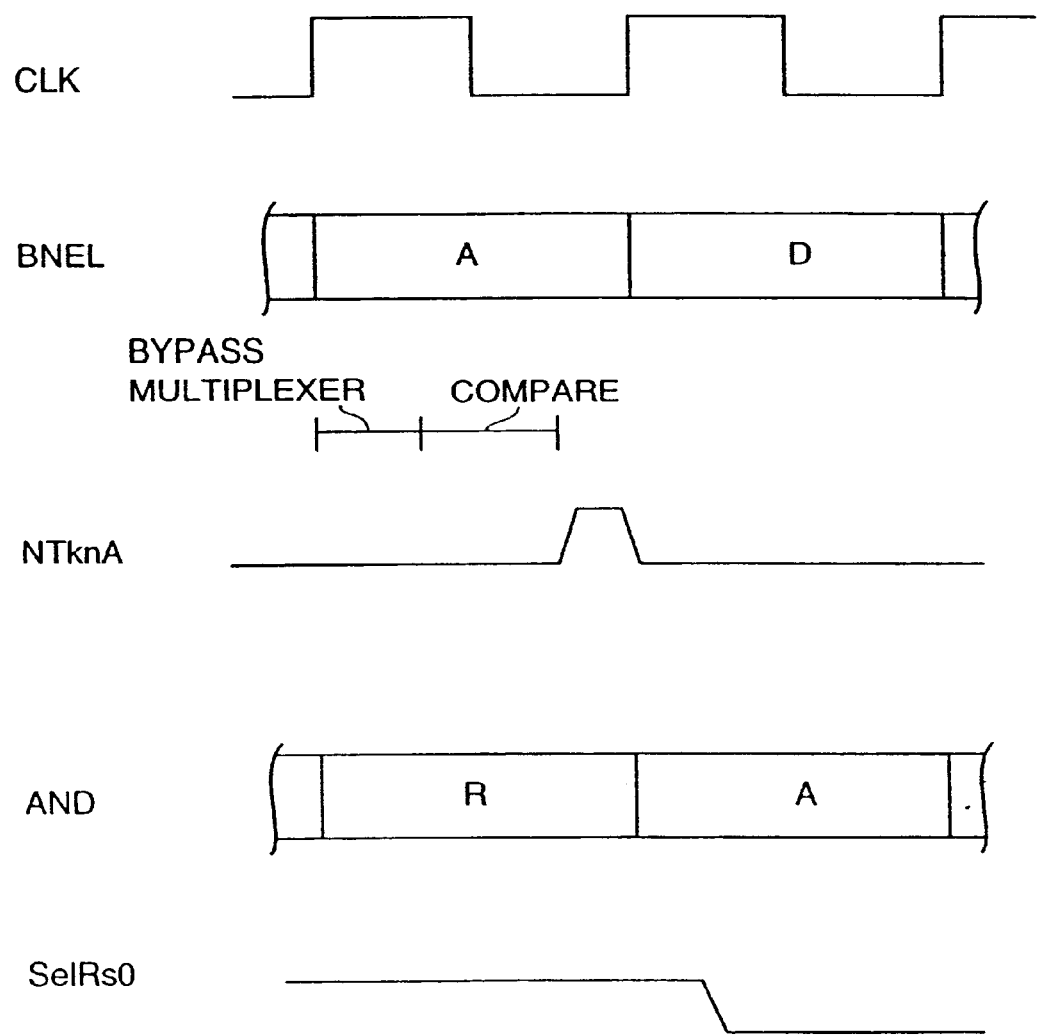
FIG. 16 is a timing chart explaining the timing of generating a branch condition not-taken signal and a select signal.

(3) When bypassing from the "D stage" to the "A stage" occurs with a normal instruction other than a conditional branch instruction:

Assume, for example, that the row of instructions shown in FIG. 12 explained above has been executed by this processor. In this case, since data bypass occurs in the fourth cycle as explained before, the bypass select logic circuit 30 is required to determine the select signals SelRs0, SelRt0, SelRs1 and SelRt1 in the preceding third cycle.

With reference to FIG. 2, explanation is made in greater detail on how the select signal SelRs0 is generated. In this example, the compare logic 72 of the select signal generating circuit 32A judges whether the source operand number Rs0R and the destination operand number Rd0A are equal or not. In this example, since the source operand number Rs0R in the "R stage" and the destination operand number Rd0A in the "A stage" are equal in the register r1, the output of the compare logic 72 is 1. That is, it is detected that a dependency about the register r1 exists between the Add instruction and the AND instruction.

Additionally, when assuming that the Add instruction is not the instruction next to the branch likely instruction, then the branch delay slot information BDS0A is 0, and the prediction result flag PrdNTkn1A is 0. Therefore, the output of the NAND circuit 34 is 1. Since the output of the compare logic is 1 and the output of the NAND circuit 34 is also 1, the output of the AND circuit 76 becomes 1. Therefore, 1 is stored in bit 0 of the flip-flop 38A. On the other hand, since the output of the AND circuit 76 is 1, one of the inputs of the AND circuit 80 and one of the inputs of the AND circuit 82 becomes 0. Therefore, the outputs of the AND circuit 80, 82 are 0, and 0is stored in bit 1 and bit 2 of the flip-flop 38A. As a result, the select signal SelRs0 is generated, and it is supplied from the flip-flop 38A to the bypass multiplexer 44 in the next fourth cycle. The bypass multiplexer 44 receiving the select signal SelRs0 having 1 in bit 0 selects an operand input from the bypass DA and outputs it to ALU 42. As a result, data bypass from the "D stage" to the "A stage" is executed in the fourth cycle.

Figure 6:
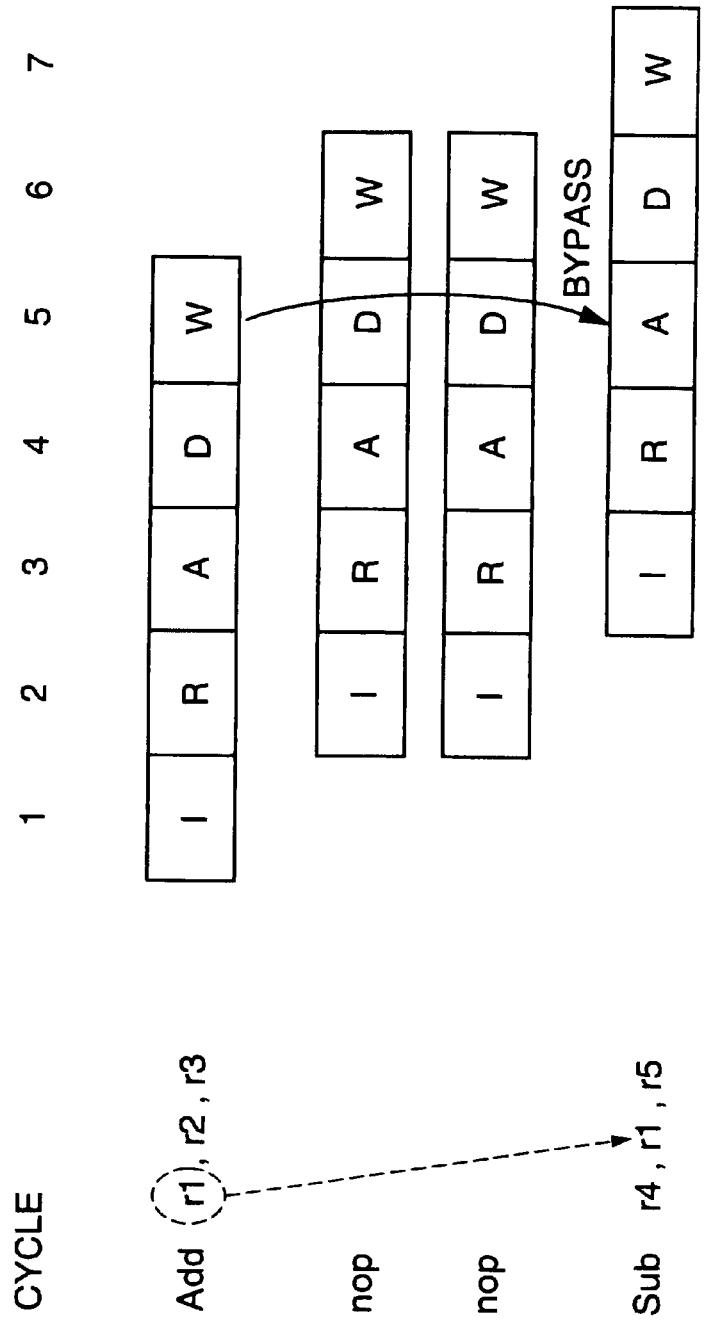
FIG. 6 is a diagram showing a row of instructions with which a data bypass from the "W stage" to the "A stage" occurs.

(4) When bypassing from the "W stage" to the "A stage" occurs with a normal instruction other than a branch instruction:

Assume, for example, that the row of instructions shown in FIG. 6 has been executed by this processor. The nope instruction in the row of instructions of FIG. 6 is an instruction of executing nothing. In this case, results of the Add instruction are stored in the register r1, and the register r1 is used as the source operand of the Sub instruction two cycles later. Therefore, in the "A stage" of the Sub instruction, the register r1 has to be data-bypassed from the "W stage".

In this manner, since data bypass occurs in the fifth cycle, the bypass select logic circuit 30 is required to establish the select signals SelRs0, (SelRt0, SelRs1 and (SelRt1 in the preceding fourth cycle.

With reference to FIG. 2, an explanation is made in greater detail on how the select signal SelRs0 is generated. In this example, the compare logic 72 of the select signal generating circuit 32A judges whether the source operand number Rs0R and the destination operand number Rd0A are equal or not. In this example, since the source operand number RS0R in the "R stage" is the register r1, and no destination operand number Rd0A exists in the "A stage", the output of the compare logic 72 becomes 0. Therefore, the output of the AND circuit 76 is 0, and 0is stored in bit of the flip-flop 38A. Additionally, since the output of the AND circuit 76 is 0, 1 is input to one of the inputs of the AND circuit 80 and one of the inputs of the AND circuit 82.

On the other hand, the compare logic 74 judges whether the source operand number Rs0R and the destination operand number Rd0D are equal or not. In this example, since the source operand number Rs0R in the "R stage" is the register r1 and the destination operand number Rd0D in the "D stage" is also the register r1, the output of the compare logic 72 is 1. That is, it is detected that a dependency about the register r1 exists between the Add instruction and the Sub instruction.

When assuming that the Add instruction is not the instruction next to the branch likely instruction, then the branch delay slot information BDS0D is 0, and the prediction result flag PrdNTkn1D is also 0. Therefore, the output of the NAND circuit 36 is 1. In this fashion, since the output of the compare logic 74 is 1 and the output of the NAND circuit 36 is also 1, the output of the AND circuit 78 becomes 1. Therefore, both inputs of the AND circuit 80 become 1, and the output of the AND circuit 80 becomes 1. As a result, 1 is stored in bit 1 of the-flip-flop 38A.

On the other hand, since the output of the AND circuit 76 is 1, the other input of the AND gate 82 is 0. Therefore, the output of the AND gate 82 becomes 0, and 0is stored in bit 2 of the flip-flop 38A. As a result, the select signal SelRs0 is generated, and it is supplied from the flip flop 38A to the bypass multiplexer 44 in the next fifth cycle. The bypass multiplexer 44 receiving the select signal SelRs0 having 1 in bit 1 selects an operand input from the bypass WA and outputs it to ALU 42. As a result, data bypass from the "W stage" to the "A stage" occurs in the fifth cycle. (5) When bypassing does not occur and a source operand from the register file 20 is selected:

This is the case where no dependency exists concerning source operands between closely positioned instructions. In this case, the compare logic 72 shown in FIG. 2 detects non coincidence between the source operand number Rs0R and the destination operand number Rd0A, and outputs 0. Therefore, the output of the AND circuit 76 becomes 0, and 0is stored in bit 0 of the flip-flop 38A.

Additionally, the compare logic 74 detects non coincidence between the source operand number Rs0R and the destination operand number Rd0D, and outputs 0. Therefore, output of the AND circuit 78 becomes 0, and 0is stored in bit 1 of the flip-flop 38A. Further, since output of the AND circuit 76 is 0and output of the AND circuit 78 is 0, both inputs of the AND circuit 82 become 1. Therefore, 1 is output from the AND circuit 82, and 1 is stored in bit 2 of the flip-flop 38A.

As a result, the select signal SelRs0 is generated, and this select signal SelRs0 is supplied to the bypass multiplexer 44 in the next cycle. The bypass multiplexer 44 receiving the select signal SelRs0 having 1 in bit 2 selects an operand from the register file 20, and outputs it to ALU 42.

As explained above, the processor according to the embodiment uses prediction result flags PrdNTkn1A, PrdNTkn1D and does not use the branch condition not-taken signals NTknA, NTknD of the branch unit 52, for generating select signals SelRs0, SelRt0, SelRs1 and SelRt1. Therefore, it can prevent the problem of timing which inevitably occurred in conventional techniques upon generating select signals SelRs0, (SelRt0, SelRs1 and SelRt1.

Figure 7:
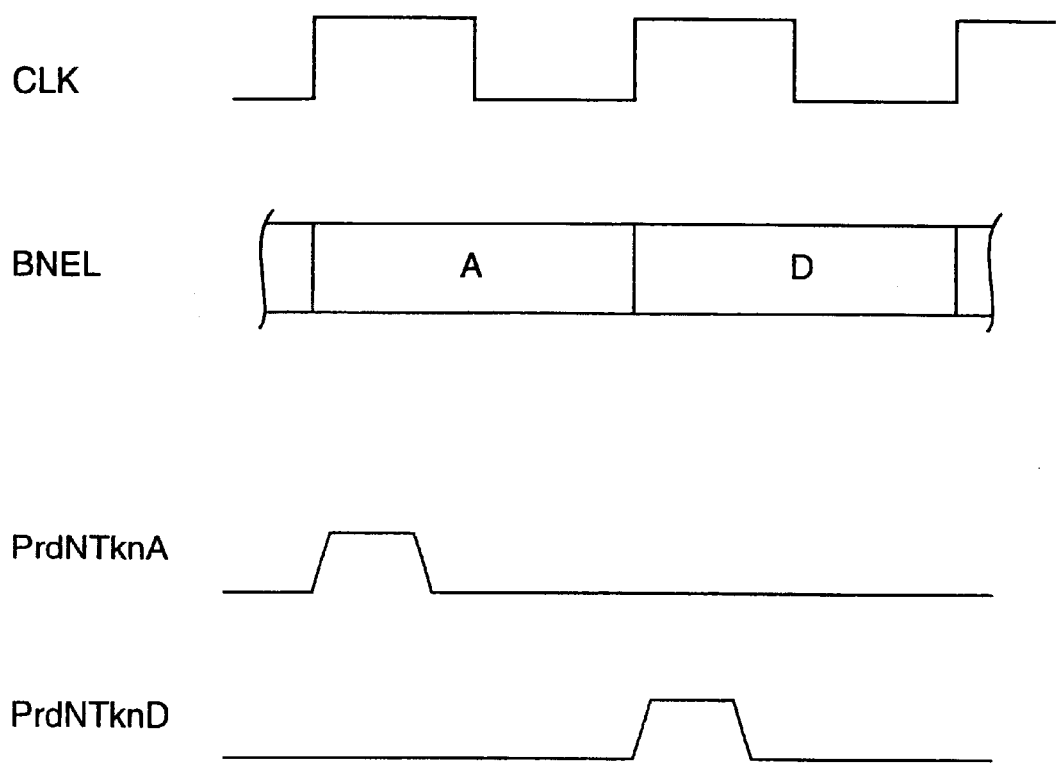
FIG. 7 is a timing chart showing the timing where a prediction result flag is determined.
Figure 8:
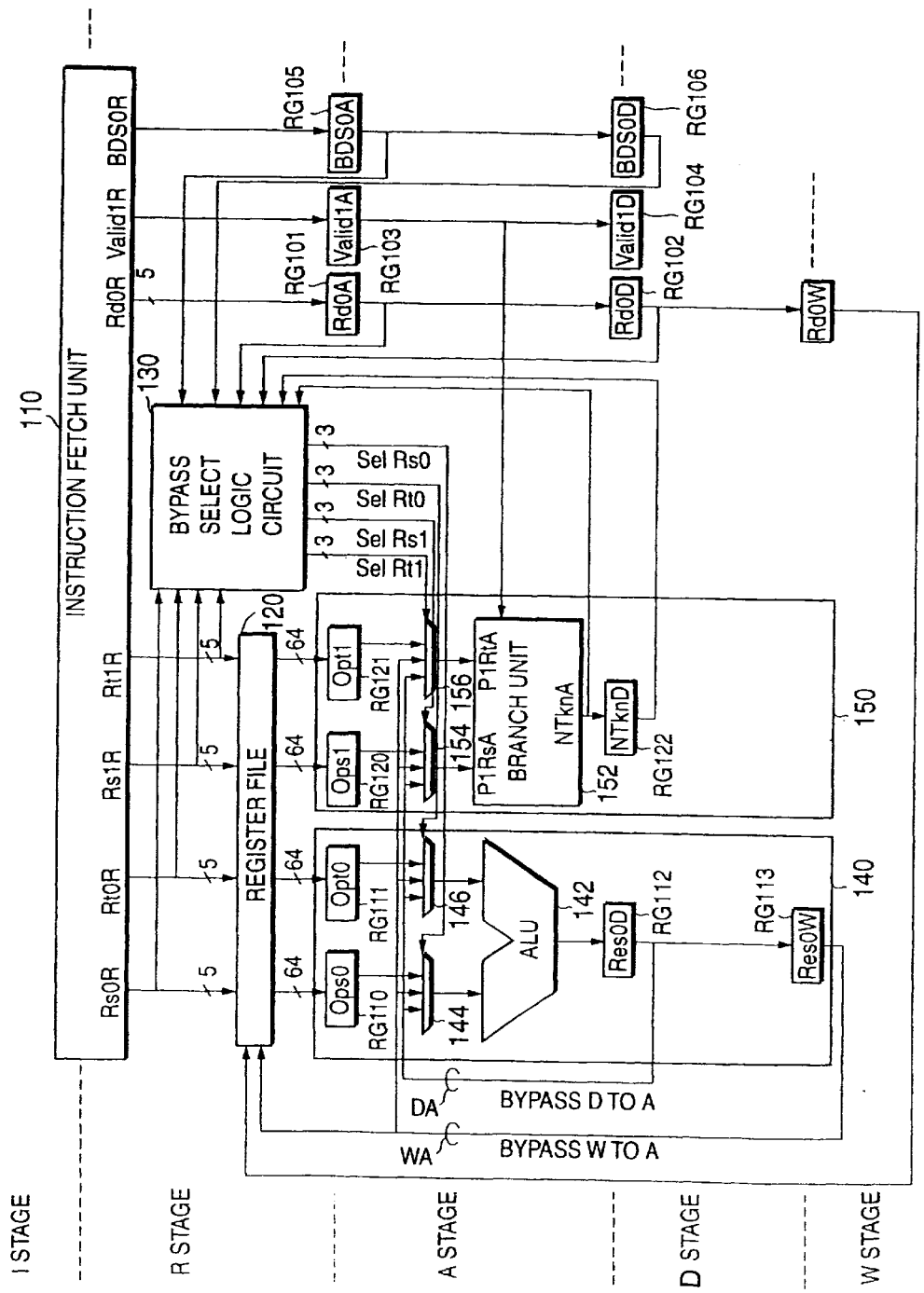
FIG. 8 is a diagram showing a major part of the internal structure of a conventional processor.

That is, prediction result flags PrdNTkn1A, PrdNTkn1D are values previously determined by the instruction fetch unit 10. Therefore, the bypass select logic circuit 30 reads out the prediction result flags PrdNTkn1A, PrdNTkn1D from the registers RG7, RG8, and can determine them at the beginning of the "A stage" or the "D stage" of the BNEL instruction as shown in FIG. 7.

Therefore, the bypass select logic circuit 30 can generate select signals SelRS0 SelRt0, SelRs1 and SelRt1, using the prediction result flags PrdNTkn1A, PrdNTkn1D established at the early timing. As a result, the bypass select logic circuit 30 has ample time for generating these select signals SelRs0, SelRt0, SelRs1 and SelRt1.

What is claim:

1. A processor which executes pipeline processing having a plurality of stages, comprising:
    an instruction fetch unit for fetching an arithmetic instruction to output a source operand number and a destination operand number of the arithmetic instruction, and when said arithmetic instruction is a conditional branch instruction, said instruction fetch unit predicting whether a condition of said conditional branch instruction will be established or not, and outputting the predicted result as prediction result information;
    a register file introducing said source operand number outputted from said instruction fetch unit to output a source operand corresponding to said source operand number;
    a first pipeline having at least a bypass multiplexer and an arithmetic and logic unit, in which said bypass multiplexer is supplied with an arithmetic result operand, which is a result of arithmetic operation of said arithmetic and logic unit, and said source operand outputted from said register file, and said bypass multiplexer selects one of said arithmetic result operand and said source operand in response to a select signal and outputs an operand selected by said bypass multiplexer to said arithmetic and logic unit;
    a second pipeline including at least a branch unit for judging whether the condition of said branch instruction has been established or not;
    a bypass select logic circuit for generating said select signal by using at least said prediction result information; and
    a plurality of prediction registers for storing said prediction result information, and said prediction result information being transferred in order of precedence to said prediction registers in synchronism with respective stages of the pipeline processing,
    wherein, when said instruction fetch unit outputs said source operand number of the arithmetic instruction located next to said conditional branch instruction in a row of instructions, said instruction fetch unit also outputs branch delay slot information indicating that said arithmetic instruction is next to said conditional branch instruction in the row of instructions.

2. The processor according to claim 1 further comprising a plurality of branch registers for storing said branch delay slot information, and said branch delay slot information being transferred in order of precedence to said branch registers in synchronism with respective stages of the pipeline processing.

3. The processor according to claim 2 wherein said bypass select logic circuit generates said select signal by using:
    said source operand number outputted from said instruction fetch unit;
    said prediction result information taken out from at least one of said prediction registers;
    said branch delay slot information taken out from at least one of said branch registers; and
    said destination operand number having reached an arithmetic stage at a stage prior to a stage of outputting said select signal.

4. The processor according to claim 3 wherein said bypass select logic circuit includes a select signal generating circuit having at least a compare logic circuit for comparing said source operand number outputted from said-instruction fetch unit with said destination operand number,
    said select signal generating circuit generating:
        said select signal of a first status causing said bypass multiplexer to select said arithmetic result operand, when said compare logic circuit detects that said source operand number coincides with said destination operand number, and when said branch delay slot information indicates that the arithmetic instruction having reached said arithmetic stage is not the arithmetic instruction next to a conditional branch instruction or said prediction result information indicates establishment of the condition; and said select signal of a second status causing said bypass multiplexer to select said source operand when said select signal generating circuit does not generate said select signal of the first status.

5. The processor according to claim 4 wherein said bypass select logic circuit further includes a flip-flop, said bypass select logic circuit generating said select signal in a stage prior to arithmetic operation by said arithmetic and logic unit and storing said select signal in said flip-flop to output said select signal from said flip-flop in the stage of arithmetic operation by said arithmetic and logic unit.

6. The processor according to claim 5 further comprising a result register for storing said arithmetic result operand.

7. A processor for executing pipeline processing including at least five stages from a first stage to a fifth stage, and having at least a normal conditional branch instruction and a branch likely instruction in an instruction set architecture, wherein said normal conditional branch instruction is for executing an arithmetic instruction positioned next to a conditional branch instruction in a row of instructions irrespective of whether a condition of said conditional branch instruction is established or not, and said branch likely instruction is for executing the arithmetic instruction positioned next to the conditional branch instruction in the row of instructions, only when the condition of said conditional branch instruction is established, the processor comprising:

an instruction fetch unit for fetching at least two arithmetic instructions and outputting one or two source operand numbers and one destination operand number for each of said arithmetic instructions, said instruction fetch unit predicting upon one of said arithmetic instructions being a branch likely instruction whether the condition of said branch likely instruction is established or not, and outputting the predicted result as prediction result information in said first stage;

a register file for receiving said source operand numbers outputted from said instruction fetch unit and outputting source operands corresponding to said source operand numbers in said second stage;

a first bypass multiplexer supplied with a first arithmetic result operand having reached said fourth stage, a second arithmetic result operand having reached said fifth stage, and a first source operand which is one of said source operands outputted from said register file, to select one of said first arithmetic result operand, said second arithmetic result operand and said first source operand in response to a first select signal and output the selection of said first bypass multiplexer as a first arithmetic operand in said third stage;

a second bypass multiplexer supplied with said first arithmetic result operand having reached said fourth stage, said second arithmetic result operand having reached said fifth stage, and a second source operand which is another of said source operands outputted from said register file, to select one of said first arithmetic result operand, said second arithmetic result operand and said second source operand in response to a second select signal and output the selection of said second bypass multiplexer as a second arithmetic operand in said third stage;

an arithmetic and logic unit supplied with said first arithmetic operand and said second arithmetic operand to execute arithmetic operation on the basis of said first arithmetic operand and said second arithmetic operand in said third stage and output the arithmetic result as an arithmetic result operand;

a third bypass multiplexer supplied with said first arithmetic result operand having reached said fourth stage, said second arithmetic result operand having reached said fifth stage, and a third source operand which is another of said source operands outputted from said register file, to select one of said first arithmetic result operand, said second arithmetic result operand and said third source operand in response to a third select signal and output the selection of said third bypass multiplexer as a first comparison operand in said third stage;

a fourth bypass multiplexer supplied with said first arithmetic result operand having reached said fourth stage, said second arithmetic result operand having reached said fifth stage, and a fourth source operand which is another of said source operands outputted from said register file, to select one of said first arithmetic result operand, said second arithmetic result operand and said fourth source operand in response to a fourth select signal and output the selection of said fourth bypass multiplexer as a second comparison operand in said third stage;

a branch unit supplied with said first comparison operand and said second comparison operand in said third stage to compare said first comparison operand and said second comparison operand and judge whether the condition of said conditional branch instruction is established or not; and a bypass select logic circuit for generating said first to fourth select signals by using at least said prediction result information in said second stage.

8. The processor according to claim 7 wherein said prediction result information is transferred in order of precedence in synchronism with respective stages of the pipeline processing, said processor further comprising:

a first prediction register for storing said prediction result information reaching said third stage as first prediction result information; and a second prediction register for storing said prediction result information reaching said fourth stage as second prediction result information.

9. The processor according to claim 8 wherein, when said instruction fetch unit outputs said source operand number of the arithmetic instruction located next to said conditional branch instruction in a row of instructions, said instruction fetch unit also outputs branch delay slot information indicating that said arithmetic instruction is next to said conditional branch instruction in the row of instructions.

10. The processor according to claim 9 wherein said branch delay slot information is transferred in order of precedence in synchronism with respective stages of the pipeline processing, said processor further comprising:

a first branch register for storing said branch delay slot information reaching said third stage as first branch delay slot information; and a second branch register for storing said branch delay slot information reaching said fourth stage as second branch delay slot information.

11. The processor according to claim 10 wherein said destination operand number is transferred in order of precedence in synchronism with respective stages of the pipeline processing, said processor further comprising:

a first destination register for storing said destination operand number reaching said third stage as a first destination operand number; and a second destination register for storing said destination operand number reaching said fourth stage as a second destination operand number.

12. The processor according to claim 11 wherein said bypass select logic circuit generates said first to fourth select signals by using:

said source operand numbers output from said instruction fetch unit;

said first prediction result information taken out of said first prediction register;

said second prediction result information taken out of said second prediction register;

said first branch delay slot information taken out of said first branch register;

said second branch delay slot information taken out of said second branch register;

said first destination operand number taken out of said first destination register; and said second destination operand number taken out of said second destination register.

13. The processor according to claim 12 wherein said bypass select logic circuit includes at least:

a first select signal generating circuit for generating said first select signal;

a second select signal generating circuit for generating said second select signal;

a third select signal generating circuit for generating said third select signal; and a fourth select signal generating circuit for generating said fourth select signal, each of said first to fourth select signal generating circuits including at least:

a first compare logic circuit for comparing one of said source operand numbers output from said instruction fetch unit with said first destination operand number; and a second compare logic circuit for comparing said one of said source operand number output from said instruction fetch unit with said second destination operand number, each of said first to fourth select signal generating circuits generating:

one of said first to fourth select signals of a first status causing said bypass multiplexer to select said first arithmetic result operand, when said first compare logic circuit detects that said one of said source operand number coincides with said first destination operand number, and when said first branch delay slot information indicates that the instruction having reached said third stage is not the instruction next to a conditional branch instruction or said first prediction result information indicates establishment of the condition;

said one of said first to fourth select signals of a second status causing said bypass multiplexer to select said second arithmetic result operand, when said second compare logic circuit detects that said one of said source operand numbers coincides with said second destination operand number, and when said second branch delay slot information indicates that the instruction having reached said fourth stage is not the instruction next to a conditional branch instruction or said second prediction result information indicates establishment of the condition, and when it does not generate said one of said first to fourth select signals of said first status; and said one of said first to fourth select signals of a third status causing said bypass multiplexer to select said source operand when it does not generate said one of said first to fourth select signals of the first status and the second status.

14. The processor according to claim 13 wherein said bypass select logic circuit further includes first to fourth flip-flops for holding said first to fourth select signals, said bypass select logic circuit generating said first to fourth select signals in said second stage and stores them in said first to fourth flip-flops to output said first to fourth select signals from said first to fourth flip-flops in said third stage.

15. The processor according to claim 14 further comprising:

a first result register for storing said arithmetic result operand reaching said fourth stage as said first arithmetic result operand; and a second result register for storing said arithmetic result operand reaching said fifth stage as said second arithmetic result operand.

* * * * *